US009149032B2

(12) United States Patent
Mettler (10) Patent No.: US 9,149,032 B2
(45) Date of Patent: Oct. 6, 2015

(54) COLLAPSIBLE WATERFOWL DECOY (71) Applicant: Paul Michael Mettler, Layton, UT (US)

(72) Inventor: Paul Michael Mettler, Layton, UT (US)

( * ) Notice: Subject to any disclaimer, the term of this patent is extended or adjusted under 35 U.S.C. 154(b) by 168 days.

(21) Appl. No.: 13/791,984

(22) Filed: Mar. 9, 2013

(65) Prior Publication Data
US 2014/0082992 A1    Mar. 27, 2014

Related U.S. Application Data (60) Provisional application No. 61/608,778, filed on Mar. 9, 2012.

(51) Int. Cl.
*A01M 31/06*    (2006.01)

(52) U.S. Cl.
CPC ........... *A01M 31/06* (2013.01); *Y10T 29/49826* (2015.01)

(58) Field of Classification Search
CPC ...................................................... A01M 31/06
USPC ............... 43/3, 2; 135/127, 128, 74; 248/156, 248/165, 175, 163.1
See application file for complete search history.

(56) References Cited

U.S. PATENT DOCUMENTS

| | | | | | |
|---|---|---|---|---|---|
| 1,603,114 | A | * | 10/1926 | Johnson | 43/3 |
| 2,478,585 | A | * | 8/1949 | Kouba | 43/3 |
| 2,489,271 | A | * | 11/1949 | Colgan | 43/3 |
| 2,536,338 | A | * | 1/1951 | Withey et al. | 43/3 |
| 2,662,327 | A | * | 12/1953 | Petersen | 43/3 |
| 2,763,952 | A | * | 9/1956 | Bruce | 43/3 |
| 2,799,961 | A | * | 7/1957 | Jaumotte | 43/3 |
| 3,245,168 | A | * | 4/1966 | Pool | 43/3 |
| 3,404,481 | A | * | 10/1968 | Speers | 43/3 |
| 4,062,141 | A | * | 12/1977 | Shjeflo | 43/3 |
| 4,172,335 | A | * | 10/1979 | Farmer | 43/3 |
| 4,318,240 | A | * | 3/1982 | Hillesland | 43/3 |
| 4,475,674 | A | * | 10/1984 | Farmer | 43/3 |
| 4,611,421 | A | * | 9/1986 | Jacob | 43/3 |
| 4,614,502 | A | * | 9/1986 | Nelson | 135/121 |
| 4,651,457 | A | * | 3/1987 | Nelson et al. | 43/3 |
| 4,689,913 | A | * | 9/1987 | Brice | 43/3 |
| 4,706,696 | A | * | 11/1987 | Gillis | 135/127 |
| 4,753,028 | A | * | 6/1988 | Farmer | 43/3 |
| 4,928,418 | A | * | 5/1990 | Stelly | 43/3 |
| 5,172,506 | A | * | 12/1992 | Tiley et al. | 43/3 |
| 5,392,554 | A | * | 2/1995 | Farstad et al. | 43/3 |
| 5,709,428 | A | * | 1/1998 | Hugghins | 135/127 |
| 5,930,971 | A | * | 8/1999 | Etheridge | 135/127 |
| 6,000,175 | A | * | 12/1999 | Gale et al. | 135/127 |
| 6,042,297 | A | * | 3/2000 | Lah | 135/127 |
| 6,050,017 | A | * | 4/2000 | Barry | 43/2 |

(Continued)

FOREIGN PATENT DOCUMENTS

| | | | | | |
|---|---|---|---|---|---|
| GB | 2131266 | A | * | 6/1984 | A01M 31/06 |
| GB | 2189124 | A | * | 10/1987 | A01M 31/06 |

*Primary Examiner* — Darren W Ark (57) ABSTRACT

The collapsible waterfowl decoy disclosed herein includes a vertical support and a horizontal support. The horizontal support includes a three-way joint which allows the horizontal support to be disposed on the vertical support through parallel ports in the three-way joint. A pin is disposed within a perpendicular port of the three-way joint. The horizontal support further includes rigid tubing that is inserted into a perpendicular port of the three-way joint. Elastic cordage is disposed around the pin and through the rigid tubing to apply elastic tension between the rigid tubing and the perpendicular port of the three-way joint.

10 Claims, 6 Drawing Sheets

(56) References Cited

U.S. PATENT DOCUMENTS

| | | | |
|---|---|---|---|
| 6,230,728 B1 * | 5/2001 | Reese | 135/127 |
| 6,240,940 B1 * | 6/2001 | Carter | 135/127 |
| 6,266,912 B1 * | 7/2001 | Jirele | 43/2 |
| 6,374,842 B1 * | 4/2002 | Carter | 135/127 |
| 6,381,896 B1 * | 5/2002 | Coker | 43/3 |
| 6,487,810 B1 * | 12/2002 | Loughman | 43/2 |
| 6,679,644 B1 * | 1/2004 | Heller | 135/127 |
| 6,745,510 B1 * | 6/2004 | Coker | 43/3 |
| 7,481,017 B1 * | 1/2009 | Bocchi | 43/3 |
| 7,694,451 B1 * | 4/2010 | Zink, Jr. | 43/3 |
| 7,716,866 B2 * | 5/2010 | Zink et al. | 43/3 |
| 7,788,840 B2 * | 9/2010 | Wyant et al. | 43/3 |
| 8,082,690 B2 * | 12/2011 | Zink, Jr. | 43/3 |
| 8,191,304 B2 * | 6/2012 | Poorman | 43/2 |
| 8,316,575 B2 * | 11/2012 | Bradley | 43/2 |
| 9,010,013 B2 * | 4/2015 | Smith | 43/3 |
| 2005/0132632 A1 * | 6/2005 | Fisher | 43/3 |
| 2007/0251135 A1 * | 11/2007 | Watlov et al. | 43/3 |
| 2008/0209792 A1 * | 9/2008 | Watlov | 43/3 |
| 2012/0198753 A1 * | 8/2012 | Idstrom | 43/3 |
| 2012/0324777 A1 * | 12/2012 | Smith | 43/2 |
| 2013/0199076 A1 * | 8/2013 | Dean et al. | 43/3 |
| 2013/0283664 A1 * | 10/2013 | Kelly | 43/3 |
| 2015/0000174 A1 * | 1/2015 | Elder | 43/2 |

* cited by examiner

COLLAPSIBLE WATERFOWL DECOY

PRIORITY CLAIM

This application claims benefit under 35 U.S.C. 119(e) to U.S. Provisional Application No. 61/608,778, which is incorporated by reference herein, in its entirety.

BRIEF DESCRIPTION

1. Technical Field

Embodiments of this patent application relate to a collapsible waterfowl decoy generally used to attract birds.

2. Description of Related Art

Birds in general are flocking creatures which means birds are attracted to other birds. Hunters have realized that bird decoys are particularly useful in waterfowl hunting for attracting waterfowl. As waterfowl migrate, they stop to rest. Waterfowl can be lulled into a false sense of security by seeing decoys, which resemble resting birds, and attracted to the vicinity of the decoys to rest themselves. Believing that the decoys are real birds flocking peacefully, the waterfowl fly to the decoys thus coming in range of hunters' shotguns. In North America, geese and ducks of various species are hunted for recreation and food. Species that are hunted vary from country to country and state to state in North America but include Snow Geese, Ross Geese, Canada Geese, and Brant Geese, Trumpeter Swans, Tundra Swans, Mallard Ducks, Canvasback Ducks, Pintail Ducks, Wood Ducks, Teal Ducks, Widgeons, Shovelers, and Gadwalls, including various subspecies of each of these species. While this list is not exhaustive, or intended to be exhaustive, it includes a number of commonly hunted species along with their respective common names for exemplary purposes.

Waterfowl hunters prepare hunting areas by laying out decoys in an area commonly known as a "spread," in strategic locations that will facilitate attraction of waterfowl. Strategic locations for decoys are areas in which the waterfowl are known to frequent or that provide cover, food, or water for the waterfowl. The spread may include any number of decoys. In some cases, many thousands of decoys may be set in the spread which is particularly labor intensive using conventional decoys.

Conventional hunting decoys have been known for thousands of years. Generally speaking, decoys are designed to simulate a particular species of waterfowl that a hunter may desire to hunt or attract. For example, during a goose hunt for Canada Geese, hunters may chose decoys that resemble Canada Geese in size and color. However, in many cases, waterfowl of one species will be attracted to decoys that do not resemble the same species but rather resemble other species of waterfowl. For example, a decoy resembling a Canada Goose may also attract Snow Geese.

Waterfowl decoys since antiquity have relied on simulated motion or a visual resemblance to attract waterfowl. In more modern times, decoys have relied on these same principles but have been created using modern technology. Today, decoys are carved from wood and painted, and/or fashioned from plastics, or other materials. However, many of these decoys are rigid and quite large. Thus these decoys require significant amounts of space which can be problematic when spreads comprise large numbers of decoys and when spreads have to be set in strategic locations that are difficult for hunters to access by foot or vehicle.

Thus, there is a need of a light-weight collapsible waterfowl decoy that can be carried in large numbers by one hunter, that require little space when collapsed, and that can be easily assembled and laid out into a spread with little effort.

SUMMARY

In one embodiment, a collapsible decoy support is disclosed. The collapsible decoy support comprises a three-way joint having a first port, a second port, and a third port. A pin is disposed within the third port. The collapsible decoy support further comprises a rigid tube including a first opening at a first end of the rigid tube and a second opening at a second end of the rigid tube. An elastic cordage is disposed around the pin and through the first opening of the rigid tube and terminating at the second end of the rigid tube.

In a second embodiment, a collapsible waterfowl decoy is disclosed. The collapsible waterfowl decoy comprises a three-way joint having a first port, a second port, and a third port. The collapsible waterfowl decoy also includes a vertical support disposed through the three-way joint via the first port and the second port. A pin is disposed within the third port. The collapsible waterfowl decoy also comprises a rigid tube including a first opening and a second opening. An elastic cordage disposed around the pin and through the first opening of the rigid tube and terminating at the second end of the rigid tube.

Also disclosed is a method of making a collapsible waterfowl decoy, which includes optimizing an elastic tension applied between a three-way joint coupled to a rigid tube by elastic cordage disposed around a pin in at least one perpendicular port of the three-way joint and a termination of the elastic cordage in one end of the rigid tube. The method further includes inserting a vertical support through a first eyelet disposed in a simulated waterfowl body. The method further includes sliding a first stop on to the vertical support. The method also includes inserting the rigid tube coupled to the three-way joint into the simulated waterfowl body. The method includes inserting the vertical support through two parallel ports in the three-way joint. The method includes sliding a second stop on to the vertical support. The method includes inserting the vertical support through a second eyelet disposed in the simulated waterfowl body.

BRIEF DESCRIPTION OF THE DRAWINGS

The accompanying drawings, which are incorporated in and constitute a part of this specification, illustrate various embodiments. In the drawings.

DESCRIPTION OF THE EMBODIMENTS

In the following description, for purposes of explanation and not limitation, specific techniques and embodiments are set forth, such as particular sequences of steps, interfaces, and configurations, in order to provide a thorough understanding of the embodiments presented herein. While the techniques and embodiments will primarily be described in context with the accompanying drawings, those skilled the art will further appreciate that the techniques and embodiments may also be practiced in other decoy types.

Reference will now be made in detail to the exemplary embodiments, examples of which are illustrated in the accompanying drawings. Wherever possible, the same reference numbers are used throughout the drawings to refer to the same or like parts.

Figure 1:
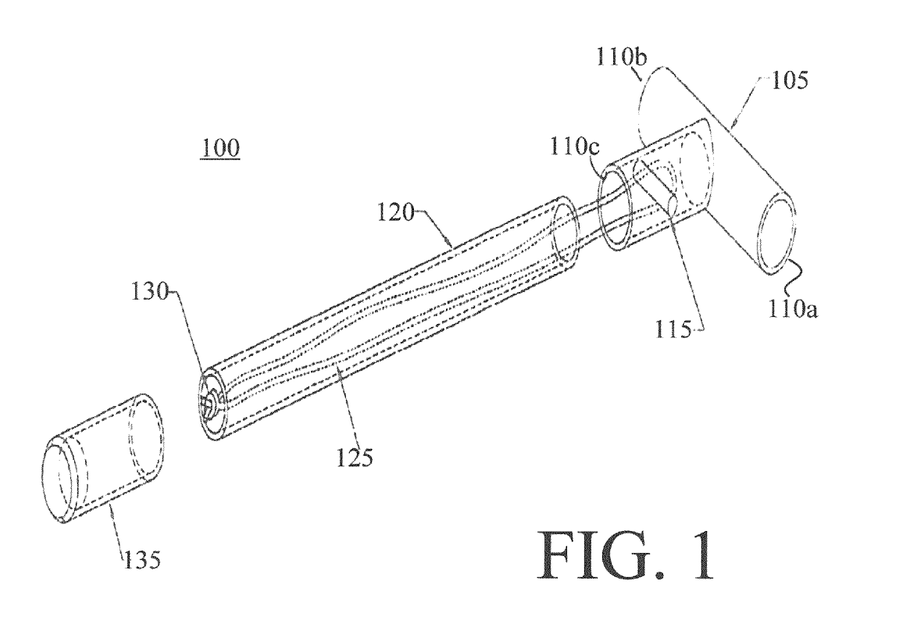
FIG. 1 shows a collapsible support member in accordance with an exemplary embodiment.

FIG. 1 shows a collapsible support member 100 in accordance with an exemplary embodiment. Collapsible support member 100 includes three-way joint 105. Three-way joint 105 has three ports, port 110a, port 110b, and port 110c and may be commonly known as a "T" or a "tee" joint. Ports 110a and 110b are each disposed at 90°, substantially perpendicular to, port 110c in three-way joint 105 and are thus disposed at opposite sides of three-way joint (180° from each other). Three-way joint 105, as shown in FIG. 1, is hollow inside and includes conical channels that connects circular ports 110a, 110b, and 110c along an inner wall of three-way joint 105. However, three-way joint 105 is not limited to conical channels and may be configured with channels of any shape. For example, the channels inside three-way joint 105 may be square, rectangular, octagonal, or triangular channels with corresponding square, rectangular, octagonal, or triangular ports 110a, 110b, and 110c. The inner wall of three-way joint 105 is continuous between ports 110a, 110b, and 110c such that the diameter of the inner walls of three-way joint 105 is substantially the same for each of ports 110a, 110b, and 110c.

Three-way joint 105 is further configured with a restraining pin 115, which is disposed in port 110c. Port 110c which is substantially perpendicular to ports 110a and ports 110b in three-way joint 105 and includes holes created on either side of port 110c along a horizontal axis of port 110c of three-way joint 105, as shown in FIG. 1. The holes created in port 110c of three-way joint may be of any shape though the holes shown in FIG. 1 are round. For example, the holes created in port 110c can be round, square, rectangular, octagonal, or triangular. While the holes in port 110c of three-way joint 105 are shown in FIG. 1 disposed along a horizontal axis of port 110c of three-way joint 105, the holes can be created along any axis of port 110c including, for example, a vertical axis or an axis at 45° above or below the horizontal axis. So long as the holes through port 110c are aligned on opposite sides of port 110c, restraining pin 115 can be placed through the holes in port 110c, as shown in FIG. 1.

While restraining pin 115 shown in FIG. 1 is round, the shape of restraining pin 115 may be any shape that corresponds to the shape of the holes in port 110c. For example, restraining pin 115 may be round, square, rectangular, octagonal, or triangular. Restraining pin 115 may be substantially the same diameter or size around the outside of restraining pin 115 as the interior diameter of the holes in port 110c of three-way joint 105 such that restraining pin 115 can be inserted and held in the holes created in 110c by tension. Optionally, restraining pin 115 may also be held in place by an adhesive such as a glue, resin, or epoxy.

In another embodiment which is not shown in FIG. 1, the holes on opposite sides of port 110c of three-way joint 105 may be different diameters, a larger diameter and a smaller diameter, and restraining pin 115 may be tapered. In this embodiment, the diameter of a tapered end of restraining pin 115 may correspond to the smaller diameter hole in port 110c of three-way joint 105 and the outside diameter of the end of restraining pin 115 opposite of the tapered end may correspond to the larger diameter hole in port 110c of three-way joint 105. The tapered end of restraining pin 115 in this embodiment may be inserted through the larger diameter hole in port 110c of three-way joint 105 until it fits snugly in the smaller diameter hole in port 110c of three-way joint 105. The end of restraining pin 115 opposite of the tapered end also fits snugly in the larger diameter hole in port 110c of three-way joint 105. As force is applied to restraining pin 115 as it is inserted through the holes in port 110c of three-way joint 105, the tension fit between restraining pin 115 and holes 110c of three-way joint 105 becomes tighter. Optionally, restraining pin 115 may also be held in place by an adhesive such as a glue, resin, or epoxy.

Port 110c of three-way joint 105 may receive rigid tubing 120. Rigid tubing 120 comprises an inner wall and an outer wall and is substantially hollow. The diameter of the outer wall of rigid tubing 120 may correspond to the interior diameter of port 110c of three-way joint 105. As before, rigid tubing 120 may conform to the selected shape for the channels inside three-way joint 105 and port 110c. For example, rigid tubing 120 may be cylindrical, square, rectangular, octagonal, or triangular so long as the shape of rigid tubing 120 is the same as the shape of port 110c and the channels inside three-way joint 105. The length of rigid tubing 120 may vary based on a particular application, as will be discussed below.

Disposed inside rigid tubing 120 is elastic cordage 125. Elastic cordage 125 may be made of any cordage that exhibits elastic properties. Cordage with elastic properties includes those cords which, when force is applied to at least a section of the cord, elastically expand to a length beyond the length of that section of cord when no force is applied to that section of cord. Some examples of such cordage include shock cords, bungee cords, rubber cords and elastic bands. As shown in FIG. 1, elastic cordage 125 is looped around restraining pin 115 in port 110c of three-way joint 105 and extended through the end of rigid tubing 120 opposite of the end that is received into port 110c of three-way joint 105. Elastic cordage 125 may be terminated at the end of rigid tubing 120 opposite of the end that is received into port 110c of three-way joint 105, represented in FIG. 1 as knot 130. However, knot 130 is merely a representation of terminated elastic cordage 125. The gathered elastic cordage 125 may be gathered using a knot, cord locks, or a restraining pin similar to restraining pin 115.

In one embodiment knot 130 may be tied in a manner such that the diameter of knot 130 may be larger than the interior diameter of rigid tubing 120. When knot 130 is formed in elastic cordage 125, it may be formed at a position along elastic cordage 125 such that elastic tension is applied to the end of rigid tubing 120 opposite of the end of rigid tubing 120 received into port 110c of three-way joint 105. In one embodiment, the elastic tension applied to rigid tubing 120, uses knot 130 to pull rigid tubing 120 into port 110c of three-way joint 105. Because the diameter of knot 130 is larger than the interior diameter of rigid tubing 120, knot 130 applies elastic tension to rigid tubing 120 without being pulled into rigid tubing 120. The elastic tension applied to rigid tubing 120 pulls rigid tubing 120 into port 110c of three-way joint 105.

However, in order to ensure that knot 130 is not pulled into rigid tubing 120, a washer, not shown in FIG. 1, may be installed at the end of rigid tubing 120 opposite of the end of rigid tubing 120 that is received into port 110c of three-way joint 105. The cordage may be installed through a hole in the center of the washer that is substantially smaller in diameter than the inner diameter of rigid tubing 120 while the outer diameter of the washer is substantially the same size as the outer diameter of rigid tubing 120. In one embodiment, the hole in the center of the washer may be of a size sufficient to allow only twice the diameter of elastic cordage 125 to pass through the washer. In another embodiment, the hole in the center of the washer may be slightly larger than twice the diameter of elastic cordage 125 to allow slightly more clearance for elastic cordage 125 to pass through the center of the washer without rubbing on the washer and without allowing knot 130 to be pulled into rigid tubing 120. Knot 130 may be formed on one side of the washer such that the washer is disposed between knot 130, the elastic cordage 125 forming knot 130 passing through the hole in the center of the washer, and rigid tubing 120 in order to apply elastic tension to rigid tubing 120 and pull rigid tubing 120 into port 110c of three-way joint 105.

In another embodiment, a second restraining pin, not shown in FIG. 1, may be installed through holes created on the end of rigid tubing 120 opposite of the end of rigid tubing 120 that is received into port 110c of three-way joint 105. The second restraining pin, not shown in FIG. 1, may be positioned in rigid tubing 120 in the manner described above with restraining pin 115. Knot 130 may be tied around the second restraining pin in order to apply elastic tension to rigid tubing 120 and pull rigid tubing 120 into port 110c of three-way joint 105. In another embodiment using a second restraining pin, an elastic band, or a length of elastic cordage that is joined on both ends so as to form a circular length of elastic cordage, may be installed between restraining pin 115 and the second restraining pin as elastic cordage 125 in order to apply elastic tension to rigid tubing 120 and pull rigid tubing 120 into port 110c of three-way joint 105.

In another embodiment, a cord lock, not shown in FIG. 1, may act as knot 130. Cord locks are devices that use spring tension to pinch a length of cordage under elastic tension such that the elastic tension is maintained. In this embodiment, the cordage looped around restraining pin 115 may be pinched by the cord lock in order to apply elastic tension to rigid tubing 120 and pull rigid tubing 120 into port 110c of three-way joint 105. In this embodiment, the outer diameter of the cord lock is no smaller than the interior diameter of rigid tubing 120 and is no larger in diameter than the outer wall of rigid tubing 120 in order to prevent the cord lock from being pulled into rigid tubing 120.

Regardless of how elastic tension is created in collapsible support member 100, an end cap 135 may be installed over knot 130. The interior diameter of end cap 135 corresponds to the outside diameter of rigid tubing 120 such that end cap 130 fits snugly over rigid tubing 120. The size of knot 130, or the washer, the second restraining pin, or the cord lock described above, are smaller in their respective outside diameters than the outer diameter of rigid tubing 120, as discussed above, to allow rigid tubing 120 to be received without obstruction into end cap 130.

Once elastic tension is applied to rigid tubing 120 via elastic cordage 125 using any of the embodiments discussed above, or combinations thereof, the amount of elastic tension applied to rigid tubing securing it into port 110c of three-way joint 105 is optimized to hold rigid tubing 120 into port 110c of three-way joint 105 while still allowing, via additional force, rigid tubing 120 to be removed from port 110c of three-way joint 105. However, when optimized, the elastic tension applied by elastic cordage 125 is not so powerful that it retracts rigid tubing 120 into port 110c of three-way joint 105. When rigid tubing 120 is removed from port 110c of three-way joint 105, collapsible support member 100 is collapsed. Though still under elastic tension when collapsed, rigid tubing 120 may easily be assembled by positioning rigid tubing 120 in a line with port 110c of three-way joint 105. The elastic tension on rigid tubing 120, if set properly, pulls rigid tubing 120 into port 110c of three-way joint 105. Thus, collapsible support member 100 may be collapsed and assembled with ease.

Collapsible support member 100 may be constructed using any material. In one embodiment, three-way joint 105, rigid support member 120, and end cap 135 may be formed from a man-made plastic material such as polyvinyl chloride or nylon, though any rigid plastic material is adequate. Alternatively, three-way joint 105, rigid support member 120, and end cap 135 may be formed using metallic materials such as aluminum, steel, iron, or alloys that have tensile strength sufficient to rigidly hold rigid tubing 120 into three-way joint 105. Restraining pin 115, or the second restraining pin discussed above, may be formed using any of the materials mentioned herein. Each of three-way joint 105, rigid support member 120, and end cap 135, and restraining pin 115 may be formed through any appropriate means such as, for example, extrusion, molding, machining and casting.

Figure 2:
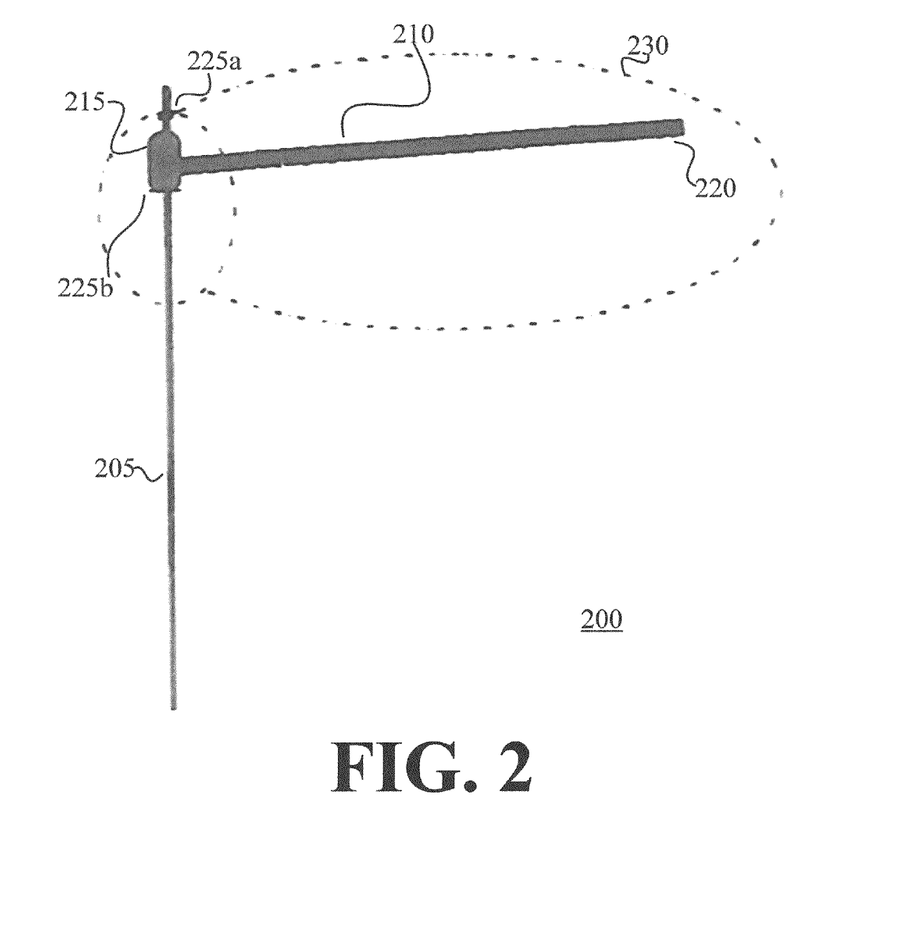
FIG. 2 shows a side view of an assembled collapsible waterfowl decoy in accordance with an exemplary embodiment.

Turning now to FIG. 2, FIG. 2 shows a side view of an assembled collapsible waterfowl decoy 200. Assembled collapsible waterfowl decoy 200 comprises vertical support member 205 and horizontal support member 210. Vertical support member 205 may be formed from a man-made plastic material such as polyvinyl chloride or nylon, though any rigid plastic material is adequate. Alternatively, vertical support member 205 may be formed using metallic materials such as aluminum, steel, iron, or other alloys. Vertical support member 205 may also be formed from natural materials such as a wood dowel. Vertical support member 205 is generally a solid cylindrical member with substantial tensile strength. Although not shown in FIG. 2, vertical support member 205 may be sharpened on one end to facilitate the driving of vertical support member 205 into dirt or the bottom of a shallow pond or lake.

Because most waterfowl hunting seasons occur during colder months when dirt is frozen, the material from which vertical support member 205 is formed must be durable enough to withstand substantial driving forces applied to vertical support member 205. For example, in some embodiments, force may be applied to the non-sharpened end of vertical support member 205 by a hammer or a mallet to drive the sharpened end of vertical support member 205 into frozen dirt. At the same time, however, the material from which vertical support member 205 is formed may be light-weight enough that many collapsible waterfowl decoys may be carried by one person. Thus, nylon, polyvinyl chloride, other rigid plastics, and aluminum are preferred materials for vertical support member 205.

Horizontal support member 210 comprises the collapsible support member 100 as shown in FIG. 1. Three-way joint 215 of FIG. 2 includes ports 110a, 110b, and 101c, as shown in FIG. 1. Rigid tubing 110 of horizontal support member 210 is received into port 110c of three-way joint 215. While not shown in FIG. 2, elastic cordage 125 shown in FIG. 1 is disposed within rigid tubing 210 in the same manner disclosed above with respect to collapsible support member 100. Rigid tubing 210 and knot 130 of FIG. 1 may be capped by end cap 220, in the same manner disclosed above with respect to end cap 130.

Three-way joint 215 of horizontal support member 210 may be attached to vertical support member 205 by inserting the non-sharpened end of vertical support member 205 into port 110b (shown in FIG. 1) of three-way joint 215 and extend through port 110a of three-way joint 215. Horizontal support member 210 is thus free to slide vertically up and down vertical support member 205. In one embodiment, horizontal member 210 may be fixed at any point along vertical support member 205 by stops 225a and 225b. Stops 225a and 225b may be hollow rubber cylinders, the inside portion of which having a diameter that corresponds in size to the outside diameter of vertical support member 205. In one embodiment, stops 225a and 225b may be disposed on vertical support member on opposite sides of ports 110a and 110b (of FIG. 1) of three-way joint 215 on vertical support member 205. With effort, stops 225a and 225b can be slid to position horizontal support member 210 at any position along vertical support member 205. Stops 225a and 225b, when disposed on vertical support member 210, may be tight enough so as to not slowly slide down vertical support member 210 over time. At the same time, stops 225a and 225b are loose enough around vertical support member 210 that, with effort, the position of horizontal support member 210 can be adjusted. In another embodiment, stops 225a and 225b may be bonded washers. Bonded washers are metallic washers that are augmented on at least one side with a layer of rubber, rubber composites, or other rubber-like material. Both the metallic portion and the rubber portion of the bonded washer have holes disposed in the center of them. The diameter of the hole in the rubber layer on the bonded washer may be smaller than the diameter of the hole in the metallic washer in order to ensure the bonded washer is held tightly to vertical support member 205.

In one embodiment, body 230 may be included in collapsible waterfowl decoy 200. Body 230 may be formed as a bag or a stocking using fabrics such as plasticized fabrics, canvas, nylon fabrics, or flash spun high-density polyethylene fibers such as Tyvek® brand fabric manufactured by the DuPont™ company headquartered in Wilmington, Del. Body 230 may be weather resistant, including being resistant to high winds. In one embodiment, body 230 is an elongated oval in shape with a substantially round opening at one end, as shown in FIG. 2 and closed at the other end. The substantially round opening at one end may be reinforced in any manner such as, for example, additional stitching, a metal insert sewn into the fabric, or impregnation with an epoxy or other resin. Body 230 includes metal grommets, also called eyelets, placed in the top and bottom of the substantially round opening of body 230 have an inside diameter larger than the outside diameter of vertical support member 205. The top of body 230, as will be discussed below, is identified by a painted design that simulates or is representative of at least one species of waterfowl.

Before horizontal support member 210 is attached to vertical support member 205, horizontal support member 210 may be inserted into the substantially round opening of bag 230. Vertical support member 205 may be slid through the grommet in the bottom of the substantially round opening of bag 230. Next, stop 225b may be slid on to vertical support member 205. Horizontal support member 210, which has been received into port 110c of three-way joint 215 by elastic tension applied from elastic cordage 125, may then be attached to vertical support member 205 by sliding vertical support member 205 through ports 110a and 110b of three-way joint 215. The grommet on the top of body 230 may then be slid onto vertical support member 205 after which stop 225a may be slid onto vertical support member 205. Collapsible waterfowl decoy 200 is thus assembled.

Figure 3:
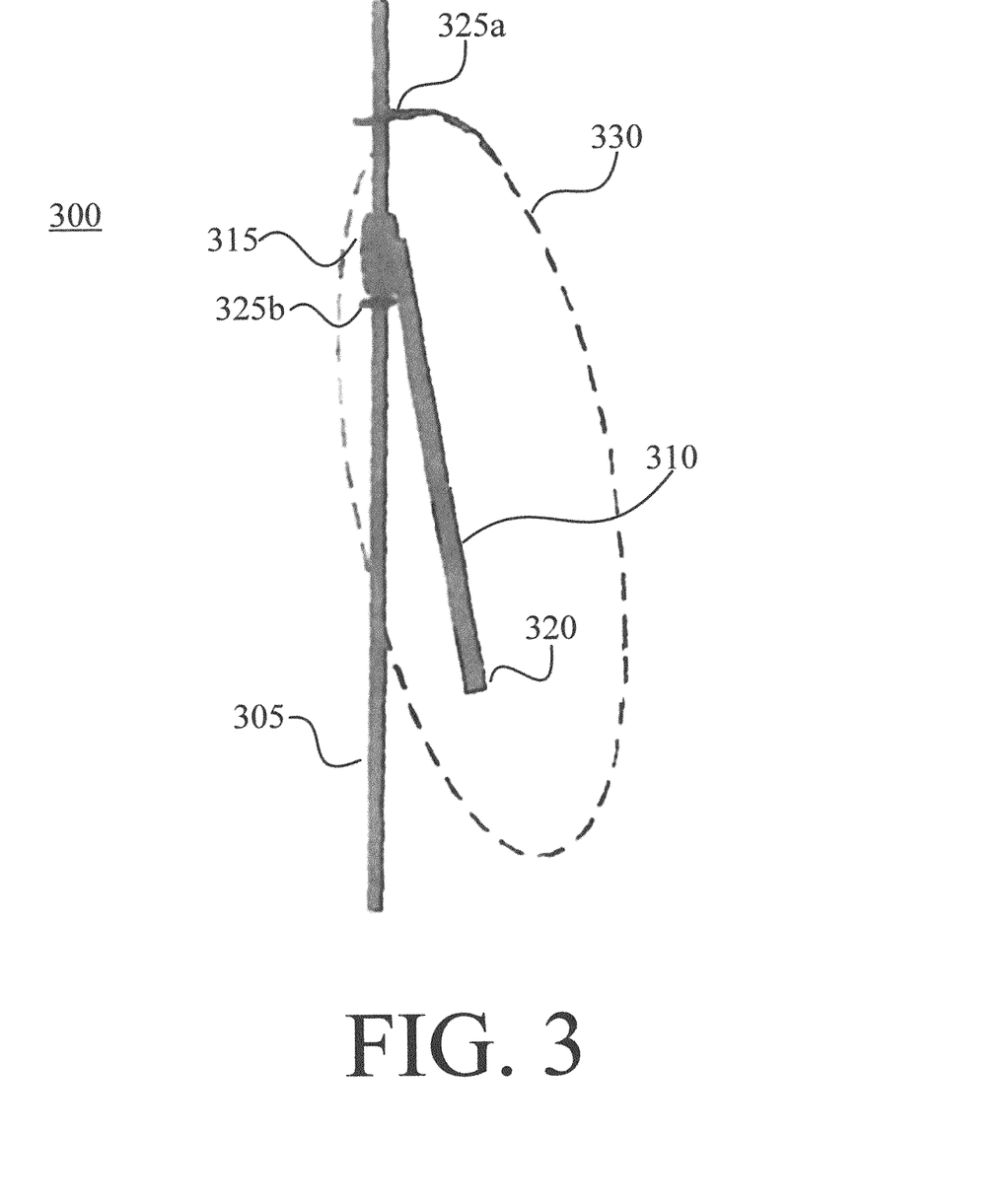
FIG. 3 shows a side view of a collapsed collapsible waterfowl decoy in accordance with an exemplary embodiment.

FIG. 3 shows a side view of a collapsed collapsible waterfowl decoy 300. Collapsible waterfowl decoy 300 comprises vertical support member 305 and horizontal support member 310 which may be formed in any manner including those described above with respect to horizontal support member 205 and 210 shown in FIG. 2. Although not shown in FIG. 3, vertical support member 305 may be sharpened on one end to facilitate the driving of vertical support member 305 into dirt or the bottom of a shallow pond or lake. Thus, the design of vertical support member 305 may be formed in a manner consistent with the foregoing description of vertical support member 205 shown in FIG. 2.

Horizontal support 310 may be fashioned in a manner consistent with the foregoing description of horizontal support member 210 shown in FIG. 2 which includes collapsible support member 100 shown in FIG. 1. Horizontal support 310 may include three-way joint 315 which includes ports 110a, 110b, and 110c and rigid tubing 120 as shown in FIG. 1 with respect to three-way joint 105. Elastic cordage 125, shown in FIG. 1 is disposed within horizontal support 310 as discussed above in connection with knot 130 shown in FIG. 1 and may be capped by end cap 320.

Stops 325a and 325b may also be disposed in a manner consistent with the foregoing description of stops 225a and 225b on vertical support member 305. Body 330 may also be formed in a manner consistent with body 230 discussed above and shown in FIG. 2. Thus, collapsible waterfowl decoy 300 may be assembled in a fashion consistent with that of assembled collapsible waterfowl decoy 200. However, in the embodiment shown in FIG. 3, horizontal support member 310, which is secured into three-way joint 315 by elastic tension supplied by elastic cordage 125 disposed within horizontal support member 310, may be removed from port 110c of three-way joint 315. When horizontal support member 310 is removed from port 110c of three-way joint 315, additional elastic tension supplied by elastic cordage 125, is applied to horizontal support member 310. However, when rigid tubing 120 of horizontal support member 310 is removed from port 110c, rigid tubing 120 may be laid almost flat along the length of vertical support 305. In other words, horizontal support member 310 may be collapsed to lie alongside vertical support member 305. Since, as discussed above with respect to FIG. 1, the elastic tension applied by elastic cordage 125 has been optimized, horizontal support member 310 may lie alongside vertical support member 305 when collapsible waterfowl decoy 300 is collapsed without being pulled back into port 110c of three-way joint 315 by the elastic tension. While it is intended that horizontal support member 310 may be retracted by the elastic tension applied by elastic cordage 125 into port 110c of three-way joint 315 with assistance, it is not intended that horizontal support member 310 is retracted by the elastic tension applied by elastic cordage 125 into port 110c of three-way joint 315 without assistance. Thus, by removing horizontal support member 310 from port 110c of three-way joint 315, collapsible support decoy may be collapsed. As shown in FIG. 2, horizontal support member 310 may be received into port 110c of three-way joint 315 in order to assemble collapsible support decoy 300. Collapsible waterfowl decoy 300 may thus be easily assembled and collapsed by inserting rigid tubing 120 into port 110c of three-way joint 315 or removing rigid tubing 120 from port 110c of three-way joint 315. Thus, collapsible decoy 300 may be easily assembled for use in a hunting spread or collapsed for easy transport because collapsible decoy 300 occupies much less physical space than conventional waterfowl decoys.

Figure 4:
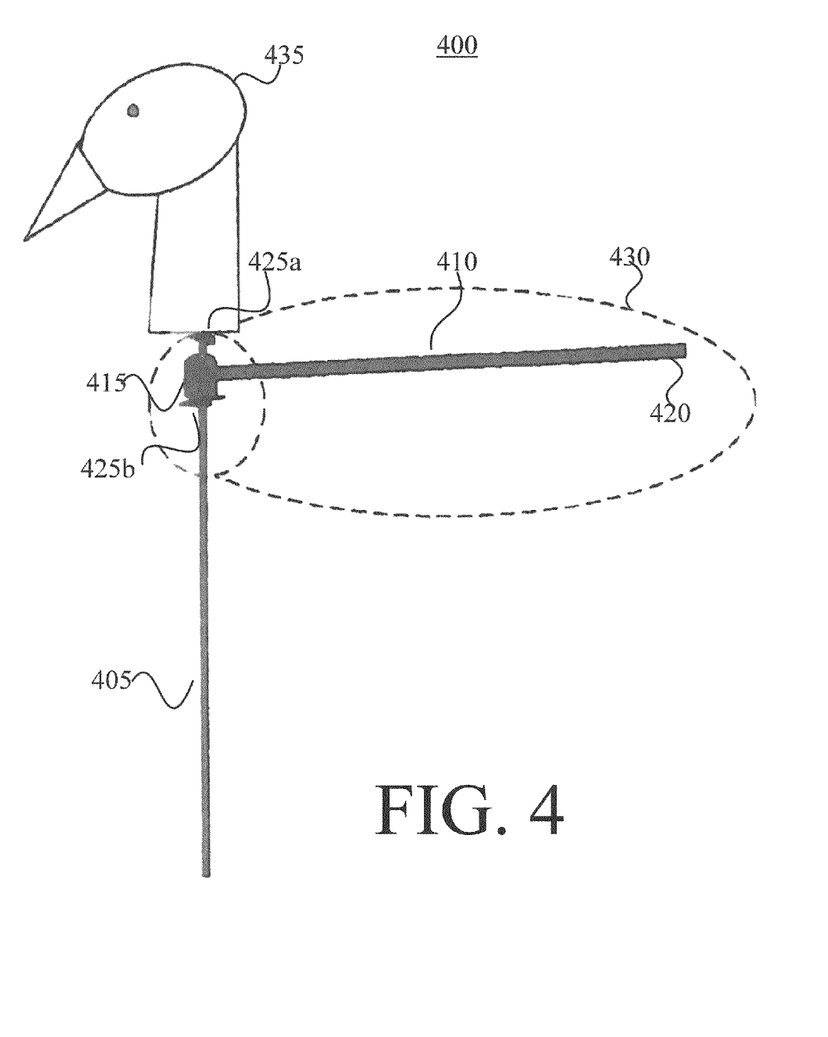
FIG. 4 shows a side view of an assembled collapsible waterfowl decoy including an optional decoy head.

FIG. 4 shows a side view of an assembled collapsible waterfowl decoy 400 substantially similar to the assembled collapsible waterfowl decoy 200 shown in FIG. 2. For example, vertical support member 405 is substantially similar to vertical support member 205 shown in FIG. 2. Horizontal support member 410 is substantially similar to horizontal support member 210 shown in FIG. 2 including the components of collapsible support member 100 (three-way joint 415, restraining pin 115, rigid tubing 120, elastic cordage 125, knot 130, and end cap 420.) Also included in FIG. 4 are stops 425a and 425b, which are similar to stops 225a and 225b shown in FIG. 2. Body 430 is also substantially similar to body 230 shown in FIG. 2. Thus, the description of each of these components in FIG. 2 applies to the similar components shown in FIG. 4. Also, the assembled collapsible support decoy 400 may be collapsed and assembled as discussed above in connection with FIG. 3.

FIG. 4 further illustrates a head 435 which may be attached to vertical support member 405. In this embodiment, head 435 may be formed through any appropriate means such as, for example, extrusion, molding, machining, and casting using any material including carved wood, extruded polystyrene, or any plastic material, such as a molded plastic. In addition, head 435 may be painted to resemble or simulate the head of a particular waterfowl species. Head 435 may be attached via a hole with an internal diameter of approximately the same size as the outer diameter of vertical support member 405. The hole in head 435 may be formed on a center of the underside of a simulated neck or directly into a head without a simulated neck in accordance with the position of vertical support member 405 and head 435 shown in FIG. 4. Vertical support member 405 may be inserted into head 435 in order to fix head 435 on vertical support member 405. In this embodiment, bag 430 and horizontal support 410 may be positioned on vertical support member 405 in such a manner as to provide a sufficient length of vertical support member 405 to be inserted into head 435 to rigidly hold head 435 on to vertical support member 405.

In another embodiment, the position of horizontal support member 410 and bag 430 along vertical support member 405 may be strategically positioned based on the physical properties of the surrounding terrain. For example, when collapsible decoy 400 is assembled in a shallow area of a lake or pond, horizontal support member 410 may be positioned along vertical support member 405 such that bag 430 remains out of the water while appearing to rest on the water much like a real waterfowl would. In another example, when collapsible decoy 400 is assembled in a field, horizontal support member 410 may be positioned along vertical support member 405 such that bag 430 rests on top of grass or stubble in the field. It is possible that there may be a substantial distance between the top of bag 430 and head 435 in this configuration. However, since the decoys are viewed from above by flying waterfowl, the waterfowl cannot discern that an unnatural distance exists between bag 430 and head 435. Thus, because horizontal support member 410 may be positioned anywhere along vertical support member 405, additional flexibility and realism is provided by assembled collapsible waterfowl decoy 400.

Figure 5:
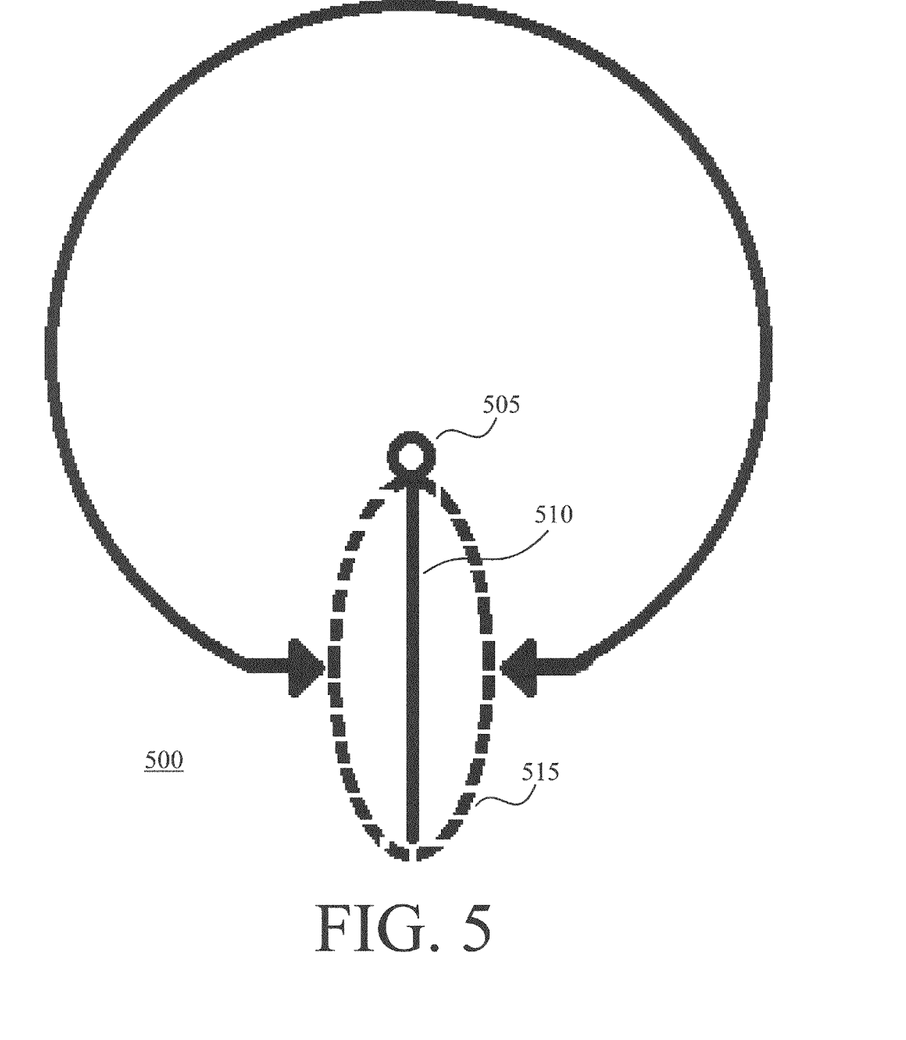
FIG. 5 shows a top down view of the assembled collapsible waterfowl decoy of FIG. 4 that is configured to rotate around a vertical axis of the collapsible waterfowl decoy.

FIG. 5 shows a top down view of the assembled collapsible waterfowl decoy 400 of FIG. 4 that is configured to rotate around a vertical axis of collapsible waterfowl decoy 500. For purposes of illustration, head 435 shown in FIG. 4 is not shown in FIG. 5. While head 435 may be included in the embodiment shown in FIG. 5, inclusion of head 435 is optional based on the perceived preferences of the waterfowl, the preferences of the hunter, and the hunter's hunting strategy. Shown in FIG. 5 is vertical support member 505, horizontal support member 510, and body 515 which are described above with respect to their corresponding parts in FIGS. 1, 2, 3, and 4. In this embodiment, three-way joint 415, shown in FIG. 4, allows horizontal support member 510 to spin around the axis defined by vertical support member 505. In other words, horizontal support member 510 may freely spin 360° around vertical support member 505 such that it may be positioned by the hunter or wind.

In one embodiment, collapsible waterfowl decoy 500 may spin freely based on the direction of the wind through the spread, simulating the natural movement of waterfowl. For example, waterfowl frequently face their bodies into the wind when flying or flocking to reduce drag and increase aerodynamics, allowing the waterfowl to rest even in powerful winds. Thus, because body 515 and horizontal support member 510 spin freely in the wind, collapsible waterfowl decoy 500 self-orients into the preferred natural orientation of waterfowl in wind. Specifically, the substantially round opening of body 515, not shown in FIG. 5, is oriented into the wind such that it mimics the natural orientation of waterfowl in the wind. Additionally, because body 515 is self-oriented into the wind, body 515 is filled by the wind, thereby closely simulating the girth of an actual waterfowl.

In one embodiment, it is possible that collapsible waterfowl decoy 500 may spin in the wind such that head 435 shown in FIG. 4, when installed, is not in-line with body 430 shown in FIG. 4. However, it is common for waterfowl to preen when resting on the ground or floating in water by craning their necks, thus orienting their heads in what appears to be an awkward position. Thus, even though head 435 is not in-line with body 515 as body 515 spins in the wind, collapsible waterfowl decoy 500 does not appear unnatural to waterfowl.

In one alternative embodiment, some hunters may prefer that collapsible decoy 500 not spin in the wind. In such a situation, three-way joint 415, shown in FIG. 4, may be pinned or glued to prevent spinning. Additionally, vertical members may be attached between stops 425a and 425b, also shown in FIG. 4, and over port 110c of three-way joint 415 to restrain the movement of horizontal support member 510 around vertical support member 505. Movement of horizontal member 510 around vertical support member 505 can also be restrained by wiring or cable ties.

Figure 6:
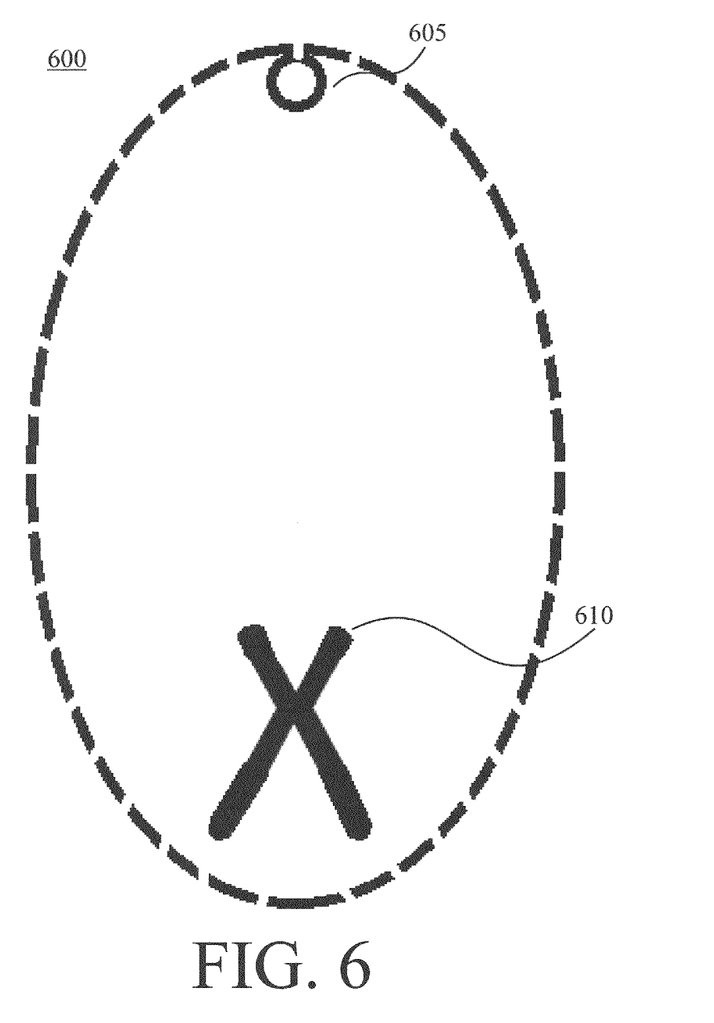
FIG. 6 shows a top down view of a collapsible waterfowl decoy body with decorative markings.

FIG. 6 shows a top down view of a collapsible waterfowl decoy body 600 with decorative markings. Collapsible waterfowl decoy body 600 comprises a substantially round opening as shown in FIG. 2 and FIG. 4 configured with grommet 605 on the top and bottom (bottom grommet not shown) of collapsible waterfowl decoy body 600. The top of collapsible waterfowl decoy body 600 is identified by decorative markings 610. In this embodiment, decorative markings 610 are painted or printed onto body 600, which may also be painted or printed in a particular color to simulate the color of real waterfowl. Decorative markings 610 may be as artistically detailed as desired though decorative markings 610 are a simple representation of a waterfowl with its wings folded behind it, in a resting position. Other more detailed representations are possible and decorative markings 610 are provided only for purposes of illustration and explanation.

While specifically designed for waterfowl applications, the embodiments disclosed herein may be applicable to other hunting decoys. For example, the collapsible waterfowl decoy disclosed herein may be used for species other than waterfowl. Collapsible waterfowl decoy may be used, for example, for turkey hunting where the body of the collapsible waterfowl decoy is configured to simulate a turkey rather than waterfowl. In another example, larger versions of the collapsible waterfowl decoy may be formed to simulate deer, elk, moose, hogs, or other mammals. Heads may be configured to correspond to the species simulated by the body of the collapsible waterfowl decoy. For example, if a deer body were simulated by the collapsible waterfowl decoy, a molded plastic head of a deer, with or without antlers, could be positioned on the collapsible waterfowl decoy like the waterfowl head, described above.

Because the collapsible waterfowl decoy disclosed above is lightweight and requires much less space than conventional decoys, a single hunter is generally able to carry hundreds of decoys at once. The collapsible waterfowl decoy is also easily assembled and collapsed while effectively simulating and attracting waterfowl to the spread. Thus, the time required to create an effective hunting spread with large numbers of decoys is greatly reduced by the collapsible waterfowl decoy disclosed herein.

The foregoing description has been presented for purposes of illustration. It is not exhaustive and does not limit the invention to the precise forms or embodiments disclosed. Modifications and adaptations will be apparent to those skilled in the art from consideration of the specification and practice of the disclosed embodiments. For example, components described herein may be removed and other components added without departing from the scope or spirit of the embodiments disclosed herein or the appended claims.

Other embodiments will be apparent to those skilled in the art from consideration of the specification and practice of the disclosure disclosed herein. It is intended that the specification and examples be considered as exemplary only, with a true scope and spirit of the invention being indicated by the following claims.

What is claimed is:

1. A collapsible waterfowl decoy comprising:
    a three-way joint having a first port, a second port, and a third port;
    a vertical support disposed through the three-way joint via the first port and the second port;
    a pin disposed inside the third port such that a longitudinal axis of the pin extends across a diameter of the third port;
    a rigid tube including a first opening at a first end of the rigid tube and a second opening at a second end of the rigid tube; and
    an elastic cordage disposed around the pin and through the first opening of the rigid tube and terminating at the second end of the rigid tube.

2. The collapsible waterfowl decoy of claim 1, further comprising a stop on the vertical support, the stop being slideable along the vertical support.

3. The collapsible waterfowl decoy of claim 1, further comprising a simulated waterfowl body.

4. The collapsible waterfowl decoy of claim 3, wherein the simulated waterfowl body is a bag formed with at least one of a plasticized fabric, canvas, a nylon fabric, and a flash spun high-density polyethylene fiber.

5. The collapsible waterfowl decoy of claim 3, wherein markings simulating a waterfowl are applied to the simulated waterfowl body.

6. The collapsible waterfowl decoy of claim 1, wherein a simulated waterfowl head is disposed on the vertical support.

7. The collapsible waterfowl decoy of claim 1, wherein the elastic cordage applies an elastic tension to the rigid tube that pulls the rigid tube into the third port of the three-way joint.

8. The collapsible waterfowl decoy of claim 7, wherein the elastic tension is optimized to allow the rigid tube to be pulled from the third port of the three-way joint.

9. The collapsible waterfowl decoy of claim 1, wherein the three-way joint and the rigid tube comprise a horizontal support.

10. The collapsible waterfowl decoy of claim 9, wherein the horizontal support is free to spin around an axis defined by the vertical support.

\* \* \* \* \*